Feb. 7, 1950     B. GOODMAN     2,496,389
TIRE CASING SPREADER
Filed Feb. 11, 1946     2 Sheets-Sheet 1
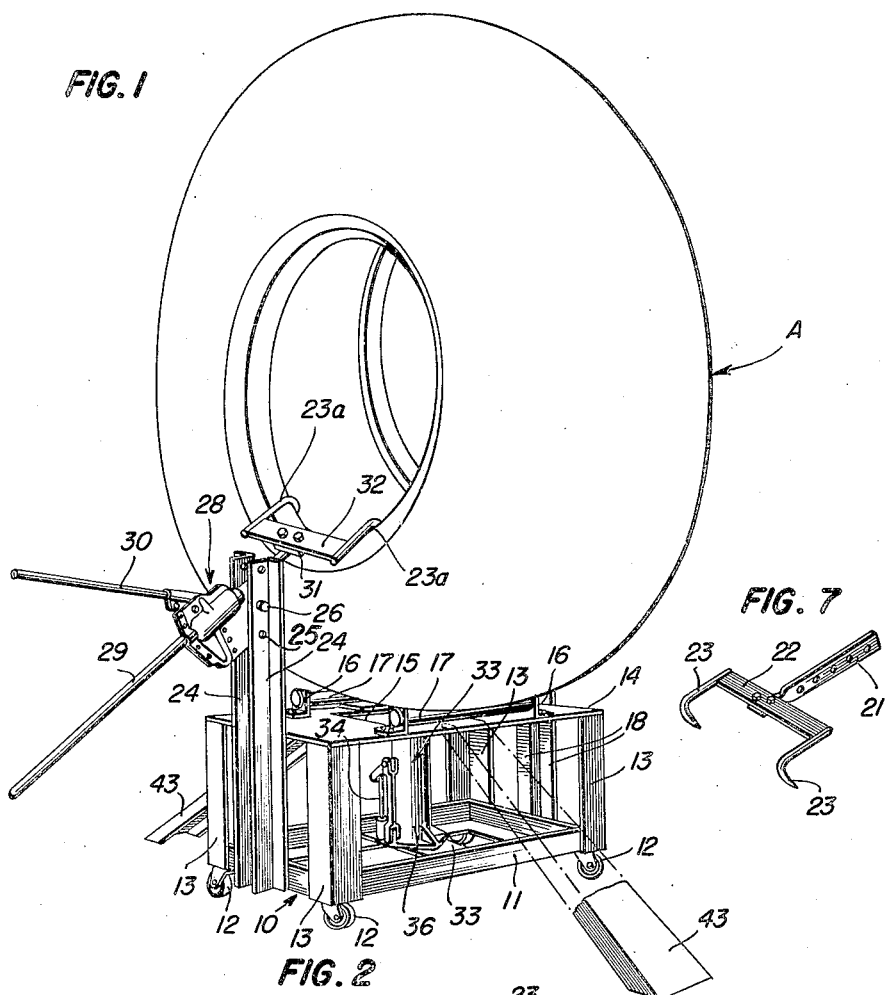
Inventor
BEN GOODMAN

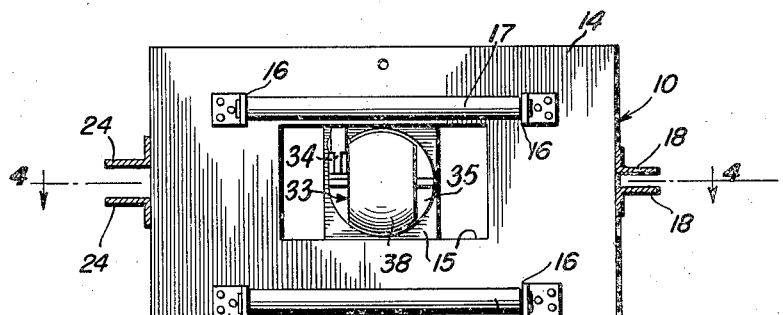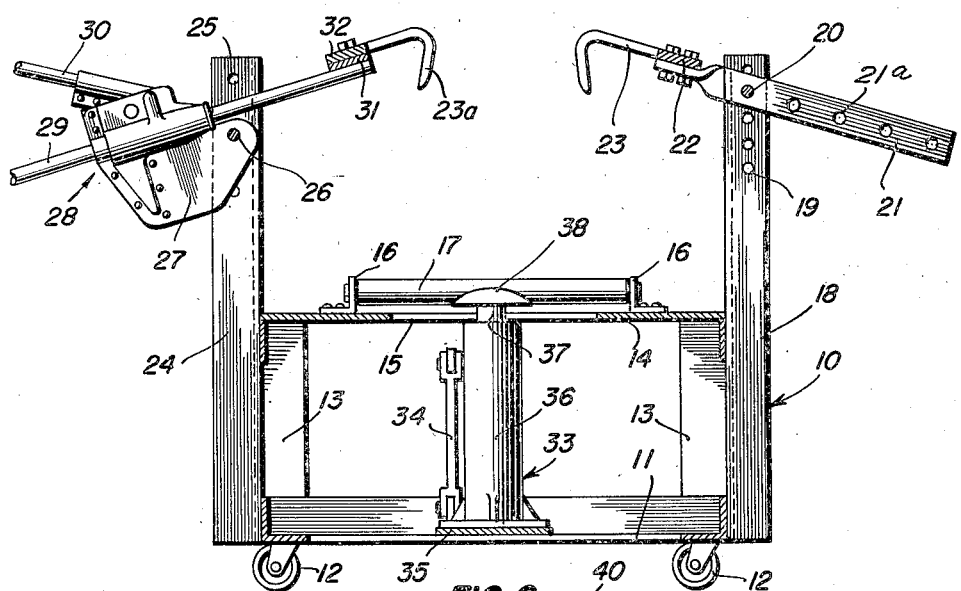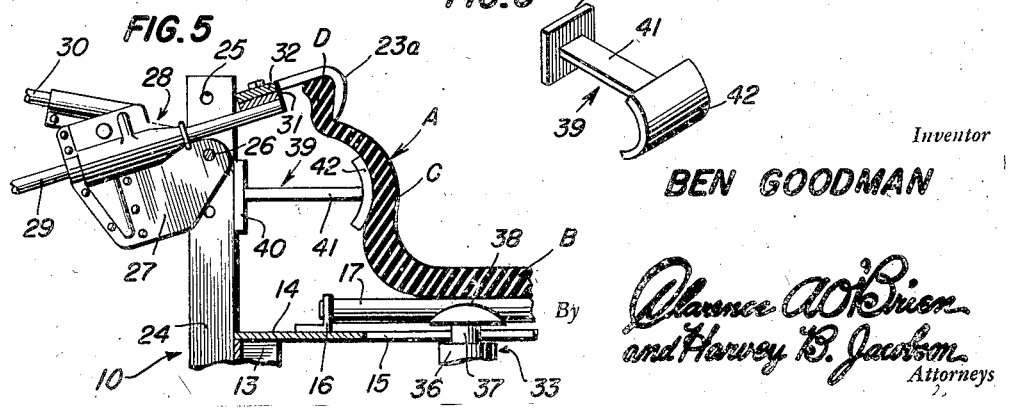

Patented Feb. 7, 1950

2,496,389

UNITED STATES PATENT OFFICE 2,496,389

TIRE CASING SPREADER

Ben Goodman, Baltimore, Md., assignor to Greenmount Manufacturing Company, Baltimore, Md.

Application February 11, 1946, Serial No. 646,755

2 Claims. (Cl. 254—50.3)

The present invention relates to certain new and useful improvements in a double purposed garage-type tire casing spreading, inspecting and repairing machine, and the principal object of the invention is to structurally, functionally and otherwise improve upon known and marketed machines such as are used for somewhat similar results and purposes.

Mechanics and other persons conversant with (1) tire inspecting and (2) repairing requirements and difficulties are full well aware of the time consuming and painstaking efforts generally put forth. This is especially true when it comes to conveniently handling, spreading and inspecting heavy duty tire casings. It follows, therefore, that numerous machines and devices have been offered and put into use and that such machines, in the main, are characterized by a portable base having a stand or table, ramp means coacting with the table, roller means on the table to facilitate locating and handling the heavy tire casing. Then too, some of these prior art devices utilize reach arms and casing engaging grapples or hooks, means being generally provided for moving said hooks toward and from each other in order to properly handle the side walls of the tire casing.

In carrying out the principles of the present invention and with a view toward providing the trade with a structure which is better adapted to accomplish desired ends I provide an arrangement which is characterized, as are some of the prior devices, by an apertured roller equipped plate or table, this supported on a carriage, said carriage being rendered more advantageous and efficient by providing thereon an optional, independently usable hydraulic or equivalent jack, the projectible and retractible plunger of said jack having an especially constructed head on its upper end, said head being arranged and fashioned to exert an end thrust pressure against the tread of the tire casing. this in a manner to indent and bulge said portion inwardly, in a manner to render highly efficient the steps of inspection and repair.

Another object of the invention is to provide auxiliary side wall indenting and bulging devices coacting with the main tread bulging device, said side wall devices also serving to inwardly bulge adjacent portions of the side walls, thus increasing the overall efficiency of my invention.

Another object of the invention has to do with the provision of a wheel supported roller equipped carriage or equivalent frame, the same provided at opposite ends with pairs of spaced parallel uprights, said uprights serving as supports for coacting spreader hooks, said hooks being vertically adjustable and movable toward and from each other to accomplish the desired pull and return movements and spreading results.

Other objects, features and advantages of the invention will become more readily apparent from the following description and the accompanying illustrative drawings.

In the drawings, wherein like numerals are employed to designate like parts throughout the views:

Figure 1 is a perspective view of a tire spreader showing the precise construction thereof and the manner in which the tire casing is supported and employed in conjunction therewith, Figure 2 is a fragmentary view, this in section and elevation, said view serving to show the manner in which the grapples or hooks coact with each other, also the manner in which the tread bulging head on the hydraulic jack functions, Figure 3 is a horizontal section, this taken on the plane of the line 3—3 of Figure 2, looking in the direction of the arrows, Figure 4 is a central vertical sectional view which may be said to be pictured approximately on the plane of the line 4—4 of Figure 3, said figure including, however, the coacting hooks, Figure 5 is a fragmentary view of one side of the structural assemblage seen also in Figure 2 but illustrating one of the side wall bulging or thrust devices in use, and Figure 6 is a perspective view of one of said auxiliary bulging or thrust devices.

Figure 7 is a perspective view of one of the details of the construction.

Referring now to the drawings by distinguishing reference numerals it will be seen that the truck or carriage is a simple portable affair and this part of the structure is generally denoted by the numeral 10. The truck proper comprises a horizontal base frame 11, this of angle iron construction and provided with wheels, casters or the like 12 to facilitate handling and mobility. At the corners are posts 13 and these serve to support a horizontal plate or table 14. This table is centrally provided with an accommodation hole 15 which serves in a manner hereinafter described. Also on top of the table I provide brackets 16 supporting elongated freely revolvable rollers 17. These rollers are properly placed on the top of the table and on opposite sides of the opening 15 to accommodate the heavy duty tire casing A. As shown, the tire casing is positioned on the rollers above the table in Figure 1.

The carriage also includes uprights arranged in spaced parallel pairs at opposite ends of said table. The uprights at one end are close together and these uprights are denoted by the numerals 18, the same having apertures 19 at their upper ends to accommodate an adjustable hinge pivot 20 and said pivot serving to accommodate an arm 21, the arm having selectively usable apertures 21a and being adjustably pivoted between its ends and provided on its laterally twisted inner end with a cross-bar 22 provided with hooks 23 to engage the adjacent side wall of the tire casing. The corresponding uprights 24 on the opposite end or side of the carriage are also provided with apertures 25 selectively usable to accommodate a hinge and adjusting pin 26. This pin serves to accommodate a fitting or fixture 27 embodying a friction jack or corresponding adjusting device 28 thereon. This adjusting device serves to accommodate a shiftable rod 29, said rod being adjusted in "in" and "out" by way of the lever control 30 forming a part of said jack structure 28. There is a head 31 on the inner end of said rod 29 and this head carries the cross-piece 32 which in turn is provided with hooks 23a, these corresponding to and coacting with the aforementioned hooks 23. The lever 21, in conjunction with its hook means, is swingable and adjustably shiftable but is the relatively stationary side wall grappling means. By this is meant that once said lever is adjusted, it does not slide freely "in" and "out" as does the rod 29. Instead the lever 21 simply pivots and the hooks 23 therefore swing in a predetermined arc. However, the hooks 23a which coact with the hooks 23 can be moved toward and from said hooks 23 by adjusting the rod 29 in relation to the friction jack means 28. The rod 29 may also be referred to as a lever with hooks on its inner end, the main difference being that this particular lever is adjustable toward and from the first named lever 21.

Referring now to Figure 4, this in conjunction with the other figures, attention is directed to a somewhat standard type hydraulic perpendicularly arranged jack, said jack denoted by the numeral 33. It includes operating means 34 and a base resting on a cross-piece 35 carried by said frame 11. The jack also includes a cylinder 36 and an adjusting plunger 37, the latter terminating at its upper end in an especially constructed convexed or "mushroom" head 38. This head 38 is a thrust element and serves to concave and thus bulge the tire casing as shown for example in Figure 2 of the drawings. The bulging head 38 moves up and down through the accommodation hole 15.

I also contemplate the use of auxiliary side wall bulging devices. These are of general T-shaped form and are denoted by the numerals 39 in Figures 5 and 6. Each device comprises a base 40 which rests against the uprights 18 and 24, as the case may be. The base carries a stem 41, and said stem terminates in an arcuately shaped presser foot or head 42. The device 39 is positioned as shown in Figure 5 and the head 42 engages the side wall of the casing. Incidently, the tread of the casing is distinguished by reference character B and the side walls are differentiated by the reference characters C. The beads on the side walls are denoted by the reference character D. It follows that the grappling hooks 23 and 23a engage with the beads and press the side walls open to thus open up the tire sufficiently for inspection and repair work. As further aids the bulging devices 38 and 42 come into play. The device 39 carrying the head 42 is more or less optional. I find, however, that by using a plurality of these auxiliary bulging devices in conjunction with the jack operated bulging head 38, the overall results are noticeably enhanced.

At this point I direct attention to the numerals 43, these designating appropriate ramps leading down from the table to the garage or other floor.

I desire to stress the specific construction of the framework forming the carriage, the apertured table or top plate 14 and the jack means 33 coacting with the aperture and located on the frame structure to accomplish the bulging step seen in Figure 2. Novelty is predicated upon the simple uprights, the hook equipped levers thereon, the friction jack means 28, and the auxiliary side wall bulging and spreading unit or devices 39.

By way of summation, I desire to set forth with emphasis the separate and optional aspects of the invention. This is important because in practice, as well as in most similar prior patents, the constructions are such that the casing spreader means is mechanically and directly linked with the bulging means and the two operate in unison. Although there may be some delay in the actual spreading and bulging steps in prior art devices, the bulging and spreading means is nevertheless interconnected. By way of contrast, it is to be observed that in the present invention the bulging jack is situated beneath the central opening in the table plate and is an optionally usable device. It is absolutely independent of the spreader means where only an inspection job is to be carried out. That is to say, if the user merely desires to use the grappling devices, the tire casing is placed on the rollers and is gradually revolved and the side walls are spread, where wanted, to make inspections and to give estimates, etc. On the other hand, where it is desired to spread the tire and then bring the independent jack into use at specified intervals for bulging purposes, this can be accomplished.

Changes in shape, size, materials and rearrangement of details and parts may be resorted to in actual practice, so long as they do not depart from the spirit of the invention or the scope of the appended claims, as is well understood.

What I claim is:

1. A tire spreader of the class described comprising a portable wheel supported carriage provided at opposite ends with uprights, a vertically adjustable lever pivotally mounted between the upper ends of said uprights at one end of said carriage, said lever being provided on its inner end with hooks, a jack, said jack including a fitting, said fitting being vertically adjustable and pivotally mounted between the remaining uprights, and a rod slidable in said jack and provided on its inner end with hooks independent of, spaced from, and coacting with the first named hooks.

2. A portable tire handling device for spreading and bulging a casing comprising a mobile truck including a horizontal base frame, supporting wheels carried by said base frame, posts rigidly connected to and rising vertically from the respective corner portions of said base frame, a horizontally disposed flat plate above said base frame rigidly connected to the upper ends of said posts, said plate constituting a one-piece table and being centrally apertured, a pair of tire casing supporting rollers fixed for rotation on the top of said plate and situated on opposite sides of the aperture, independently operable jack means mounted on said base frame in alignment with said aperture, said jack means including a headed plunger, the head on the plunger being convexed for bulging the tread of the casing when the latter is supported on the rollers above said aperture, uprights rigidly connected to opposite ends of the base frame and plate and extending above said plate, manually actuable levers pivotally, adjustably and detachably mounted on the upper ends of said uprights, and adjustable casing grappling and spreading hooks mounted on the inner ends of said levers and coacting with each other, and auxiliary side wall thrust devices for bulging the side walls of said tire casing, said devices being used by themselves or in conjunction with said tread bulging plunger head, each device being applied and removed by hand and optionally usable, each device including a convexed head to contact and bulge a predetermined area of the side wall of the casing and further including a flat base which is adapted to rest firmly for support against an adjacent upright whereby it is possible to spread the casing without using the tread and side wall bulging devices or to use the latter, singly or collectively, in conjunction with said spreading hooks.

BEN GOODMAN.

REFERENCES CITED

The following references are of record in the file of this patent:

UNITED STATES PATENTS

| Number | Name | Date |
|---|---|---|
| 1,595,883 | Simpson | Aug. 10, 1926 |
| 1,849,034 | Dettling | May 8, 1932 |
| 1,878,515 | Hazard | Sept. 20, 1932 |
| 2,323,144 | Long | June 29, 1943 |
| 2,347,311 | Branick | Apr. 25, 1944 |
| 2,364,242 | Prentice | Dec. 5, 1944 |
| 2,375,595 | Stoehr | May 8, 1945 |